United States Patent [19]

Anderson et al.

[11] Patent Number: 4,694,634
[45] Date of Patent: Sep. 22, 1987

[54] VACUUM SEALING DEVICE FOR INSULATED STEAM INJECTION TUBING

[75] Inventors: Paul T. Anderson; Lawrence Irwin; John C. Matthews, all of Lancaster; Charles E. Paugh, Canal Winchester, all of Ohio

[73] Assignee: The Babcock & Wilcox Company, New Orleans, La.

[21] Appl. No.: 776,254

[22] Filed: Sep. 16, 1985

[51] Int. Cl.$^4$ ............................................. B65B 1/00
[52] U.S. Cl. ............................ 53/88; 29/156.7 C:418; 53/101; 53/275; 53/319; 53/405; 53/489
[58] Field of Search ................... 29/156.7 C:418, 446; 53/79, 88, 97, 101, 106, 275, 281, 319, 403, 405, 408, 432, 489

[56] References Cited

U.S. PATENT DOCUMENTS

| | | | |
|---|---|---|---|
| 2,032,862 | 3/1936 | Wilkins | 53/88 X |
| 2,700,497 | 1/1955 | Hall | 53/101 X |
| 3,924,762 | 7/1974 | Walles | 53/88 |

Primary Examiner—Timothy V. Eley
Attorney, Agent, or Firm—Vytas R. Matas; Robert J. Edwards

[57] ABSTRACT

A vacuum sealing device includes a plug which is thrust into the port of an insulated steam injection tubing for closing an annular space of the tubing which confines a vacuum. The plug is mounted for movement within a first mounting element and for movement within a bellows having an end connected to the first mounting element. A second mounting element is connected to the opposite end of the bellows and carries a rod which is fixed to the plug. By moving the two mounting elements together, the bellows is compressed and the plug is thrust by movement of the rod. The first mounting element is connected to an upper clamping section which cooperates with a lower clamping section to engage around a tubular to be plugged. The upper section can be correctly centered with its plug over the port of the tubular by momentarily compressing the bellows to extend the plug. The plug is provided with a shank portion and a breakable tab for breaking the plug away from the shank portion. The shank portion is connected to the rod so that after the plug is seated in the port the rod, its mounting elements and the clamp section can be removed from the insulated steam injection tubing.

8 Claims, 3 Drawing Figures

VACUUM SEALING DEVICE FOR INSULATED STEAM INJECTION TUBING

FIELD AND BACKGROUND OF THE INVENTION

The present invention relates, in general, to insulated steam injecting tubing and, in particular, to a new and useful device for sealing a port that communicates with an annular space between inner and outer tubines of the insulated steam injecting tubing, to maintain a vacuum in that space which was drawn through the port.

U.S. Pat. No. 4,396,211 to McStravick et al discloses an insulated tubular conduit for use in forming a tubing string in a subterranean well. The conduit comprises inner and outer tubing with an annular cavity formed therebetween. A fixture is provided for evacuating the gases from the annular cavity. This fixture includes a clamp extending around the exterior of the outer tubing. A passage extends radially through the fixture and communicates with an evacuation port in the outer tubing. A plug, such as a tapered pin, surrounded by an annular seal, can be inserted into this passage. A vacuum hose connected to the fixture and communicating with the passage can be connected to a vacuum pump for drawing a vacuum from the annular cavity. After a suitable vacuum has been drawn, the pin which is a tapered pin, is driven into the vacuum part to close the annular cavity.

U.S. Pat. No. 1,472,019 to Hitch discloses a double walled receptacle in the form of a bottle having an outer shell and an inner shell wherein an air chamber is provided between the inner and outer shells. A tapered air passage is formed in the outer shell. A sleeve is clamped to the receptacle and provides a passageway and communication with the tapered air passage which, in turn, provides a passage for drawing air from the air chamber. A driver bar fits within the sleeve passageway and a tapered plug is supported on the end of the driver bar. After an appropriate vacuum has been created in the chamber, the driver bar is struck with a tool to drive the plug into the tapered air passage to seal the chamber. A similar device for sealing off a metal tank is disclosed in U.S. Pat. No. 2,032,862 to Wilkins. In this patent, a ram is used to force a sealing plug into a chamfered and slightly tapered opening in a tank. An end of the ram carries a spring wire holder and over this holder, there is forced a plug. The plug is drilled at the surface which contacts the ram. The hole is of a size sufficiently small to permit the plug to be pressed tightly over the holder and to be securely attached thereto.

None of the patents discussed above discloses the provision of a breakable tab portion between a plug portion and a shank portion of a pin which is driven into an aperture of an outer tube to seal the annulus between the outer and inner tube. These features, however, are found in the present invention and distinguish it from the older patent.

Other references which are of interest to the present application are as follows:
U.S. Pat. No. 29,582 to Gill
U.S. Pat. No. 30,440 to Wildey
U.S. Pat. No. 311,253 to Mussel
U.S. Pat. No. 1,150,242 to Bartlett
U.S. Pat. No. 1,463,723 to Otsuki
U.S. Pat. No. 1,848,319 to Clifford
U.S. Pat. No. 2,016,045 to Munters
U.S. Pat. No. 2,367,756 to Cummings
U.S. Pat. No. 3,065,583 to Miller
U.S. Pat. No. 3,240,227 to Burkholder
U.S. Pat. No. 3,406,987 to Hunder et al.

SUMMARY OF THE INVENTION

The present invention relates to a method and apparatus for sealing a port in the outer tubular of insulated steam injection tubing, after a vacuum has been established in an annular space between the inner and the outer tubulars comprising the insulated steam injection tubing. The apparatus comprises a saddle clamp which includes an aperture that is aligned with the port and which houses a pin. The pin is insertable in the part by means of a hydraulic press. The aperture also includes a flow path for evacuation of the annular space wherein a vacuum in the annular space may be maintained during the process of inserting the pin. The pin comprises a plug portion, a shank portion which cooperates with the press for driving the plug portion into the port and a tab portion connected to the plug and shank portions. The end of the plug portion is tapered to a slightly smaller diameter than the body of the plug portion to aid in guiding the plug portion into the part. With a port diameter in the neighborhood of 0.4 to 0.5 inches, a plug portion has a diameter which is at least 0.003 inches greater than the port diameter (preferably on the order of 0.006 inches greater) to provide a satisfactory interference fit for a consistently satisfactory vacuum seal. The tab portion has a sufficienty small diameter (on the order of 0.093 in.) so that the force from insertion of the plug portion in the port will break the tab portion.

Accordingly, an object of the present invention is to provide a method and apparatus which is capable of sealing the vacuum port for the annular space of an insulated steam injection tubing while maintaining a vacuum in the annular space.

A further object of the invention is to provide a vacuum sealing device for an insulated steam injection tubing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its references, reference is made to the accompaying drawings and descriptive matter in which a preferred embodiment of the invention is illustrated.

DESCRIPTION OF THE PREFERRED EMBODIMENT

Figure 1:
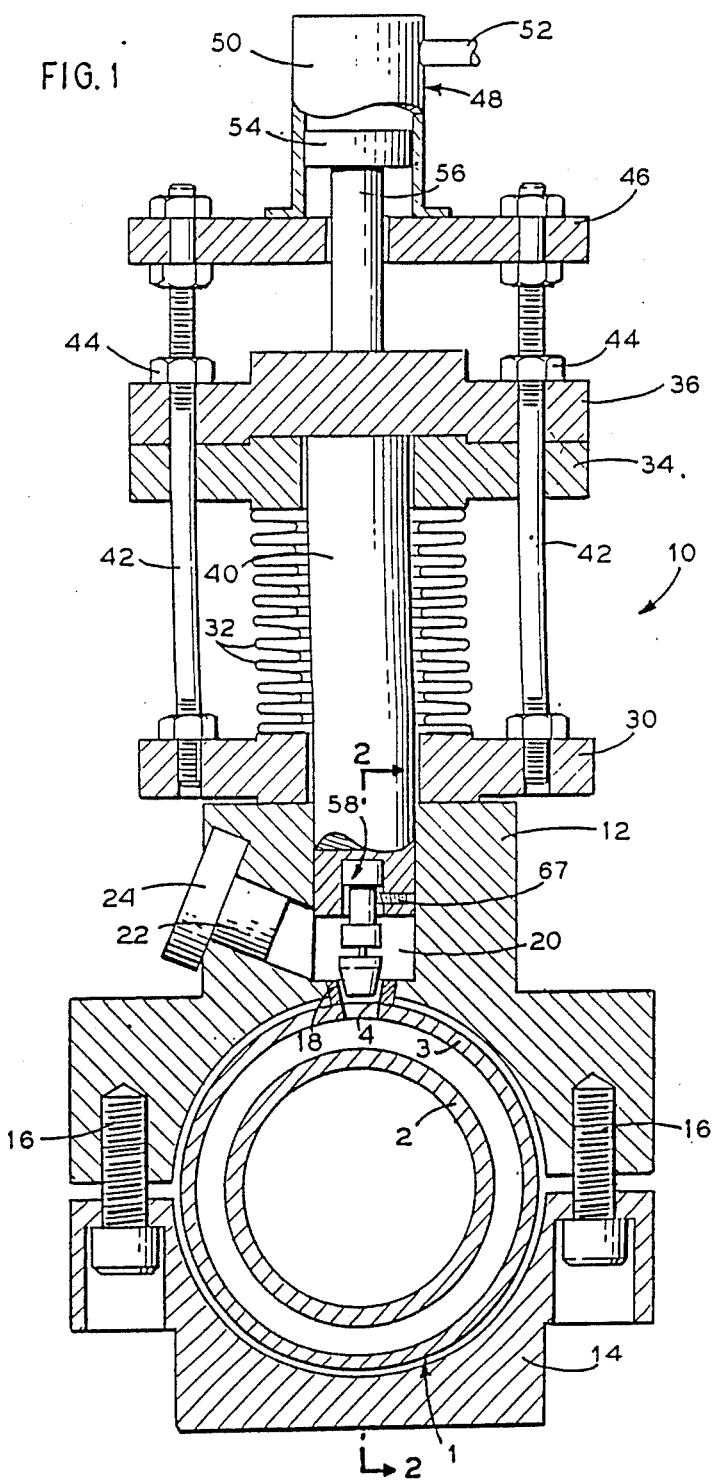
FIG. 1 is a sectional view taken through the inventive vacuum seal device and radially through an insulated steam injection tubing to which the device is connected.

Referring to the drawings, in particular, the invention embodied therein comprises a vacuum seal device generally designated 10 in FIG. 1 for drawing a vacuum from and sealing the annular space of an insulated steam injection tubing generally designated 1. Tubing 1 includes an inner tube 2 and an outer tubular 3 which defines an annular space therebetween. A port 4 is provided in the outer tubular 3 which communicates with the annular space.

The vacuum sealing device 10 includes an upper section 12 having a lower curved recess for engaging over the tubing 1, and a lower section 14 having an upper curved recess for engaging under the tubing 1. Sections 12 and 14 are bolted together by bolts 16. A sealing gasket 18 is provided in the curved recess of upper section 12 around the port 4 for establishing a seal with an interior space 20 of the upper section 12. Space 20 has a lower opening which communicates with port 4.

Figure 2:
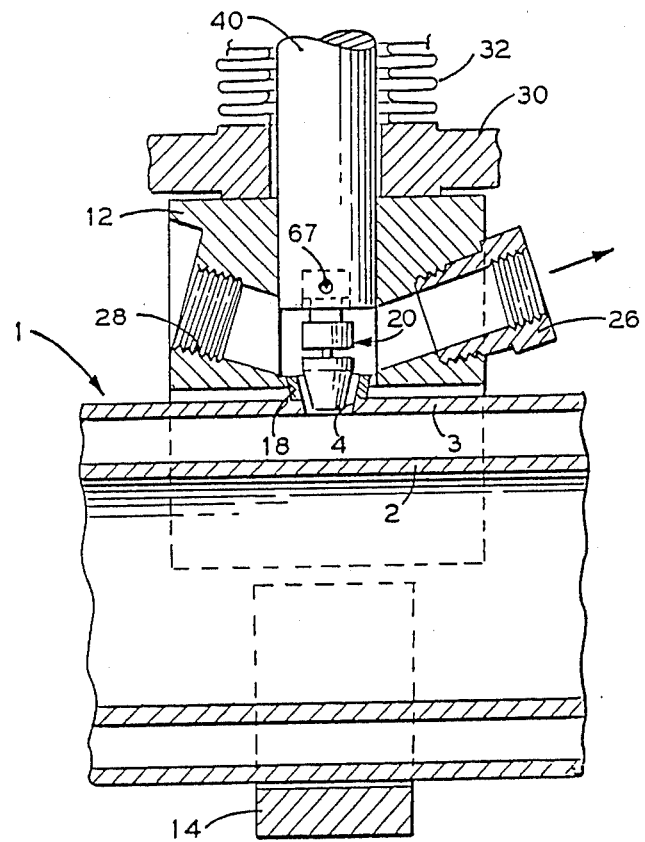
FIG. 2 is a partial sectional view taken along the line 11—11 of FIG. 1.

An observation passage 22 is also provided in upper section 12 which communicates with the space 20 and which receives a lens or viewing window 24 for viewing the space 20. As shown in FIG. 2, a connector 26 which is adopted for connection to a vacuum pump is threaded into another passage in upper section 12 which also communicates with space 20. A further passage 28 is also provided for a vacuum sensing device which is capable of sensing the extent of vacuum in the space 20.

A first mounting plate 30 is fixed to upper section 12 and has an opening therethrough aligned with the space 20. A flexible metal bellows 32 has its lower end connected to plate 30. The upper end of bellows 32 is fixed to a second mounting plate 34, as shown in FIG. 1, which also has an opening therein that is aligned with the opening of plate 30 and with the space 20. Second mounting plate 34 includes a plate portion 36 which is fixed thereto and which is firmly connected to the upper end of a pushing or centering rod 40. Pushing rod 40 extends through the opening of plate 34, the opening of plate 30 and into space 20. Through the resilient action of bellows 32, second mounting plate 34 can move donwwardly and upwardly with respect to first mounting plates 30 and the upper section 12. To guide this movement, a pair of guide rods 42 each extend through openings in plate 34,36 and have lower ends connected to the first mounting plate 30. A stop nut 44 is threaded onto each rod 42 above plate portion 36 to limit the upward movement of second mounting plate 34.

A third mounting plate 46 is fixed to the top end of each rod 42 and is held fixed with respect to first mounting plate 30. Third mounting plate 46 carries a piston and cylinder combination 48 which comprises a cylinder 50 having a space that can be pressurized through a connection 52, and a piston 54 movable in that space. Cylinder 50 is fixed to third mounting plate 46. Piston 54 has a piston rod 56 which extends downwardly through an opening in plate 46 into engagement with plate portion 36. By pressurizing pressure connection 52, piston 54 and its piston rod 56 move downwardly to move second mounting plate 34 downwardly in turn compressing bellows 32 and moving pushing rod 40 downwardly.

Figure 3:
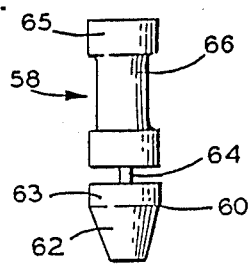
FIG. 3 is an enlarged elevational view showing the plug assembly.

A sealing pin generally designated 58 is fixed to the bottom end of pushing rod 40. As best shown in FIG. 3, sealing pin 58 has a lower plug 60 and an upper shank 65. Shank 65 is connected to plug 60 by a small diameter breakable tab 64. Plug 60 has a lower conical portion 62 and an upper cylindrical portion 63. The outer diameter of cylindrical portion 63 is slightly larger than the inner diameter of port 4 so that, with plug 60 fully seated in port 4, a good vacuum seal is established. The conical portion 62 is provided merely for guiding the plug 60 into port 4.

Pin 58 is held in a lower recess of pushing rod 40 by a set screw 67 which engages in a small diameter portion 66 of shank 65.

To utilize the inventive device, bellows 32 is first compressed by pushing plates 30 and 34 together either manually or through the aid of piston and cylinder combination 48. This extends, at least the conical portion 62 of plug 60, down through the lower opening of space 20 and beyond the curved recess of upper setion 12. In this condition, section 12 is placed over an insulated steam injection tubing 1 and the conical portion 62 of plug 60 is placed in port 4 of outer tubular 3. Gasket 18 can previously be connected to the upper section for proper engagement around the port 4. Bellows 32 can then be released which allows plate 34 to move away from plate 30 until this motion is stopped by nuts 44 on guide rod 42. Lower section 14 is then engaged around the lower part of tubing 1 and bolted to the upper section using bolts 16.

A vacuum pump is connected to connector 26 and a vacuum detector is connected to passage 28. The vacuum pump is operated until a satisfactory vacuum is achieved within the annular space between tubulars 2 and 3 of insulated steam injection tubing 1.

At this point, the space is cylinder 50 is pressurized through its pressure connection 52 which causes the downward movement of piston 54 and its piston rod 56. This, again, moves plate 34 downwardly, compressing bellows 32 and simultaneously moving pushing rod 40 downwardly. Since sealing pin 58 is fixed to the lower end of rod 40, the plug 60 of pin 58 is pushed into the port 4. Pin 58 is guided by its conical portion 62 until the cylindrical portion 63 is seated within the port 4. This can be verified by viewing the space 20 through window 24. At this point, a seal is established. The tab 64 is dimensioned so that, with the release of pressure in cylinder 50, the resiliency of bellows 32 withdraws pushing rod 40, thus breaking the tab 64. The tab 64 may also be broken by the abrupt downward movement of the plug. Tab 64 is dimensioned so that it is strong enough to ensure a vacuum seal between cylindrical portion 62 and the port 4 before it breaks however.

While a specific embodiment of the invention has been shown and described in detail to illustrate the application of the principles of the invention, it will be understood that the invention may be embodied otherwise without departing from such principles.

What is claimed is:

1. A vacuum sealing device for plugging a port in a tube comprising:
    clamping means adapted to engage around a tube and over a port to be plugged in the tube, said clamping means having a space with an opening;
    a vacuum connector connected to said clamping means and communicating with said space for drawing a vacuum from said space;
    a sealing pin movable in said space between a first position spaced away from said opening and a second position extending into said opening, said sealing pin having a plug portion and a shank portion with a breakable tab connected between said plug portion and shank portion; and
    drive means for driving said sealing pin from its first position to its second position whereby said plug portion can be sealed into a port of a tube engaged by said clamping means, and for breaking said tab to separate said plug portion from said shank portion.

2. A device according to claim 1, wherein said plug portion includes a conical part tapering outwardly from a small diameter to a larger diameter and a cylindrical part connected to said conical part at its larger diameter, said cylindrical part being connected to said shank portion by said tab.

3. A device according to claim 2, wherein said drive means comprises a push rod connected to said shank portion, a mounting plate connected to said push rod and movable with respect to said clamping means, and a bellows connected between said mounting plate and said clamping means and extending around said push rod, said push rod extending at least partly into said space of said clamping means and said bellows closing said space for confining a vacuum therein.

4. A device according to claim 1 wherein said clamping means comprises an upper section having a curved recess and a lower section having a curved recess and said lower section means for connecting said upper section said lower section said drive means comprising a mounting plate movably mounted with respect to said upper section, a pushing rod having one end connected to said mounting plate and an opposite plate connected to said sealing pin, and confining means extending between said mounting plate and said upper section and around said pushing rod for closing said space of said upper section to maintain a vacuum therein, said confining means being compressible and expandible to permit relative movement between said mounting plate and said upper section.

5. A device according to claim 4, wherein said confining means comprises a bellows.

6. A device according to claim 5, wherein said drive means includes a cylinder connected to said upper section and a piston movable in said cylinder with a piston rod engageable with said mounting plate for pushing said mounting plate to move said sealing pin from its first position to its second position.

7. A device according to claim 6, wherein said plug portion includes a conical part tapering outwardly from a small diameter to a larger diameter and a cylindrical part connected to said conical part at its larger diameter, said cylindrical part being connected to said shank portion by said tab.

8. A device according to claim 7, including at least one guide rod connected to said upper section, said mounting plate having an opening therethrough for receiving said guide rod, said guide rod extending in a direction of relative movement between said mounting plate and said upper section.

* * * * *